United States Patent
Zenati et al.

(10) Patent No.: US 11,360,535 B2
(45) Date of Patent: Jun. 14, 2022

(54) MANAGEMENT OF A PRE-CHARGE CIRCUIT OF A BATTERY MANAGEMENT SYSTEM

(71) Applicant: Saft America, Inc., Cockeysville, MD (US)

(72) Inventors: Ali Zenati, Jacksonville, FL (US); Christopher Thorpe, Jacksonville, FL (US); Theodore Brown, Jacksonville, FL (US)

(73) Assignee: Saft America, Inc., Cockeysville, MD (US)

( * ) Notice: Subject to any disclaimer, the term of this patent is extended or adjusted under 35 U.S.C. 154(b) by 364 days.

(21) Appl. No.: 16/586,027

(22) Filed: Sep. 27, 2019

(65) Prior Publication Data

US 2021/0096628 A1    Apr. 1, 2021

(51) Int. Cl.
*G06F 1/28* (2006.01)
*H02J 7/00* (2006.01)

(52) U.S. Cl.
CPC .............. *G06F 1/28* (2013.01); *H02J 7/0072* (2013.01)

(58) Field of Classification Search
CPC .................................. G06F 1/28; H02J 7/0072
See application file for complete search history.

(56) References Cited

U.S. PATENT DOCUMENTS

| | | | |
|---|---|---|---|
| 5,576,609 A | 11/1996 | Brown et al. | |
| 5,600,575 A | 2/1997 | Anticole | |
| 10,056,774 B2 * | 8/2018 | Daigo | H02J 7/0068 |
| 2009/0033294 A1 * | 2/2009 | Odajima | H02J 7/1415 320/166 |
| 2011/0111268 A1 * | 5/2011 | Weng | H01M 10/441 429/50 |
| 2013/0241427 A1 | 9/2013 | Kesterson et al. | |
| 2014/0028088 A1 * | 1/2014 | Salziger | G01R 27/2605 307/9.1 |
| 2016/0272076 A1 * | 9/2016 | Fan | B60L 53/14 |
| 2017/0166075 A1 * | 6/2017 | Hong | B60L 50/66 |
| 2018/0033224 A1 * | 2/2018 | Klesyk | H02M 7/537 |
| 2018/0083438 A1 * | 3/2018 | Reed | H02H 9/001 |
| 2018/0186248 A1 * | 7/2018 | Juhl | B60L 3/04 |
| 2018/0226824 A1 * | 8/2018 | Sakabe | B60L 58/16 |
| 2018/0272870 A1 * | 9/2018 | Burkman | B60L 3/0069 |
| 2018/0345813 A1 * | 12/2018 | Hackner | H02H 9/001 |

(Continued)

FOREIGN PATENT DOCUMENTS

| | | |
|---|---|---|
| CN | 207098682 U | 3/2018 |
| CN | 108964569 A | 12/2018 |

OTHER PUBLICATIONS

International Searching Authority—International Search Report—International Application No. PCT/US2020/052156, dated Nov. 25, 2020, together with the Written Opinion of the International Searching Authority, 14 pages.

*Primary Examiner* — Aurel Prifti
(74) *Attorney, Agent, or Firm* — Sunstein LLP (57) ABSTRACT

The present invention is notably directed to methods and systems for protecting a pre-charge circuit. The present invention is further directed to related computer-implemented program product. The method comprises monitoring the current flowing through the current limiting device, calculating the energy loading of the current limiting device over time, and managing the system state to prevent damaging operation of the pre-charge circuit.

16 Claims, 7 Drawing Sheets

(56) References Cited

U.S. PATENT DOCUMENTS

| | | | |
|---|---|---|---|
| 2019/0033390 A1* | 1/2019 | Yamada | H01M 10/48 |
| 2019/0064907 A1* | 2/2019 | Kurian | H02J 7/007 |
| 2019/0229521 A1* | 7/2019 | Roberts | H02M 1/32 |
| 2021/0075341 A1* | 3/2021 | Yamagishi | H02M 1/32 |
| 2021/0091763 A1* | 3/2021 | Miura | H02M 7/537 |

* cited by examiner

MANAGEMENT OF A PRE-CHARGE CIRCUIT OF A BATTERY MANAGEMENT SYSTEM

FIELD

The invention relates in general to the field of Energy Storage System and more specifically to the monitoring for unsafe operating conditions of a pre-charge circuit.

BACKGROUND

A Battery Management System (BMS) is an electronic control system that has multiple functions for example in an Energy Storage System (ESS). These functions include but are not limited to monitoring the battery state, (State of Charge, State of Health, temperature, current flow, etc), controlling the battery connection with the application load, and performing battery safety monitoring and functions such as inhibiting overcharge, over discharge, and so on. The BMS notably comprises a Battery Management Module (BMM). A typical Energy Storage System is comprised of energy storage modules and a battery management system.

One of the primary BMS functions is to control the connection of the battery modules to the application. To do this, the BMS typically comprises one or more devices to control the connection of the battery to the application and is able to monitor the current flowing through the system. This function is typically provided by electromechanical devices capable of conducting the energy in the system and interrupting that current as required.

When connecting the battery modules to an application there may be an initial inrush of current due to capacitive elements that exist in application load. As known in the art, the inrush current is the instantaneous high input current drawn by a power supply or electrical equipment at turn-on. The inrush current is due to the high initial currents required to charge the capacitors. The inrush current can cause damage to the contactors by exceeding the rated capacities of the devices and causing premature aging or failure of the devices in question.

To prevent the damage that may occur due to closing contacts on the initially high inrush current, the BMM implements an inrush current limiting device, known or commonly referred to as a pre-charge circuit. The pre-charge circuit is used to regulate the current to levels that will not cause undue wear on the contactors of the BMM. The pre-charge circuit is used to charge the capacitive elements of the system before closing the primary current path. The pre-charge circuit is generally comprised of two primary functional elements: an electromechanical relay (also referred to as pre-charge contactor) to connect or disconnect the circuit and high energy resistor (also referred to a pre-charge resistor) to limit the current. These two elements are selected to be compatible with the conditions present in the application. The pre-charge resistor is selected to provide a level of current that will charge the capacity elements in the application load to a level that will permit the primary current switching elements to be connected to the load without damage. The pre-charge contactor is selected to be compatible with the voltage and current levels permitted by the current limiting device.

While performing the inrush current limiting function, the pre-charge resistor may be required to dissipate significant amounts of energy depending on the amount of energy required to charge the capacitance present in the application. However, there is a risk of overheating of the pre-charge resistor. The pre-charge resistor is a core component of a pre-charge circuit of a BMS which functions to reduce the risk of contactor welding which may be present when closing the contactors on capacitive component of an application load without limiting the current flowing the system.

Hence, to preserve the normal function of the system in the application it is necessary to protect the pre-charge circuit of the BMS against operating in a way that would cause overheating of the current limiting pre-charge resistor which would cause a degradation or loss of pre-charge capability, leading ultimately to damaging operation of the other current switching elements in the BMS.

BRIEF SUMMARY OF THE INVENTION

According to a first aspect, the present invention is embodied as a method for managing a pre-charge circuit of a battery management system (BMS), the pre-charge circuit comprising a dissipative energy component. Such method comprises:
computing an energy accumulated $E_{AJ\_N}$ by the dissipative energy component for a period of time $t_N$;
computing an energy $E_{C\_N}$ by the dissipative energy component for the period of time $t_N$;
computing a remaining energy $E_{AJ\_Total\_N}$ stored on the dissipative energy component at the end of the period of time $t_N$ with the formula $E_{AJ\_Total\_N} = E_{AJ\_N} - E_{C\_N}$; and
determining whether the computed $E_{AJ\_Total\_N}$ exceeds a first threshold representing a first known value value $E_{AJ\_Total\_N\_1}$ of remaining energy.

In examples, the method may further comprise one or more of the following:
if the remaining energy $E_{AJ\_Total\_N}$ exceeds the first threshold, issuing a first alarm informing that the dissipative energy component has exceed a maximum of remaining energy at which a pre-charge sequence can occur; and/or
determining that the remaining energy $E_{AJ\_Total\_N}$ falls below the first threshold and resetting the first alarm; and/or
determining whether the remaining energy $E_{AJ\_Total\_N}$ exceeds a second threshold representing a second value of $E_{AJ\_Total\_N}$ and if the computed $E_{AJ\_Total\_N}$ is determined as exceeding the second threshold, issuing a second alarm informing that a damage of the dissipative energy component will occur; and/or
determining whether the remaining energy $E_{AJ\_Total\_N}$ exceeds a second threshold representing a second value of $E_{AJ\_Total\_N}$, if the computed $E_{AJ\_Total\_N}$ is determined as exceeding the second threshold, issuing a second alarm informing that a damage of the dissipative energy component will occur, determining that the remaining energy $E_{AJ\_Total\_N}$ falls below the second threshold and resetting the second alarm upon user's acknowledgement; and/or
computing the energy accumulated $E_{AJ\_N}$ with the formula $E_{AJ\_N} = E_{AJ\_N-1} + I^2 r^* t$, where
$E_{AJ\_N-1}$ is a latest known value of the energy accumulated by the dissipative energy component;
$I^2$ is a square value of a current I in ampere that is measured in the resistor for the period of time $t_N$;
r is a resistance of the resistor in ohms;
t is the time in seconds of the period of time $t_N$; and/or
iterating the computations of energies and the determination for P further periods of time tN+M, where M is incremented at each iteration by 1 and comprised between 1 and P.

According to another aspect, the invention is embodied as a battery management system (BMS). The BMS comprises:
an input connector connectable to an energy storage module;

an output connector connectable to an application load;
pre-charge circuit comprising a dissipative energy component;
a processing circuitry operatively coupled to a data storage memory, the data storage memory comprising instructions to configure the processor to:
compute the energy accumulated $E_{AJ\_N}$ by the dissipative energy component for a period of time $t_N$;
compute the energy evacuated $E_{C\_N}$ by the dissipative energy component for the period of time $t_N$;
compute the remaining energy $E_{AJ\_Total\_N}$ stored on the dissipative energy component at the end of the period of time $t_N$ with the formula $E_{AJ\_Total\_N} = E_{AJ\_N} - E_{C\_N}$; and
determine whether the computed $E_{AJ\_Total\_N}$ exceeds a first threshold representing a first value of $E_{AJ\_Total\_N}$.

The system may further comprise one or more of the following:
instructions to configure the processor to issue, if the remaining energy $E_{AJ\_Total\_N}$ is determined as exceeding the first threshold, a first alarm informing that the dissipative energy component has exceed a maximum of remaining energy at which a pre-charge sequence can occur; and/or below the first threshold and resetting the first alarm; and/or
instructions to configure the processor to determine whether the remaining energy $E_{AJ\_Total\_N}$ falls below the first threshold and resetting the first alarm; and/or
instructions to configure the processor to determine whether the remaining energy $E_{AJ\_Total\_N}$ exceeds a second threshold larger than the first threshold, the second threshold representing a second value of $E_{AJ\_Total\_N}$, and if the computed $E_{AJ\_Total\_N}$ is determined as exceeding the second threshold, to issue a second alarm informing that a damage of the dissipative energy component will occur; and
instructions to configure the processor to determine that the remaining energy $E_{AJ\_Total\_N}$ falls below the second threshold, and to reset the second alarm upon user's acknowledgement; and/or
the dissipative energy component is a resistor, and wherein the instructions to configure the processor to compute the energy accumulated $E_{AJ\_N}$ further comprises instructions to configure the processor to compute the energy accumulated $E_{AJ\_N}$ with the formula $E_{AJ\_N} = E_{AJ\_N-1} + I^2 r * t$, where
$E_{AJ\_N-1}$ is a latest known value of the energy accumulated by the dissipative energy component;
$I^2$ is a square value of a current I in ampere that is measured in the resistor for the period of time $t_N$;
r is a resistance of the resistor in ohms;
t is the time in seconds of the period of time $t_N$; and
a current sensor for measuring the current I in the resistor, the current sensor being communicatively coupled to the processing circuitry; and/or
the pre-charge circuit is connected in parallel to main power contactor on a line connecting an input connector with an output connector, and wherein the pre-charge circuit further comprises a pre-charge contactor and a dissipative energy component, and further comprising instructions to configure the processor to open and/or close the contactor on the line and/or the pre-charge contactor; and/or
instructions to configure the processor to iterate the computations of energies and the determination for P further periods of time $t_{N+M}$, where M is incremented at each iteration by 1 and comprised between 1 and P.

According to another aspect, the invention can be embodied as a computer program product having program instructions that cause a computerized system to perform the above methods.

The computer program can be stored on the data storage memory of the BMS system for causing the processing circuitry to perform the above methods.

According to a further aspect, it is proposed a non-transitory computer-readable data storage medium comprising the computer program.

Systems, products and methods embodying the present invention will now be described, by way of non-limiting examples, and in reference to the accompanying drawings.

BRIEF DESCRIPTION OF SEVERAL VIEWS OF THE DRAWINGS

Similar or functionally similar elements in the figures have been allocated the same reference signs if not otherwise indicated.

DETAILED DESCRIPTION OF EMBODIMENTS OF THE INVENTION

Figure 2:
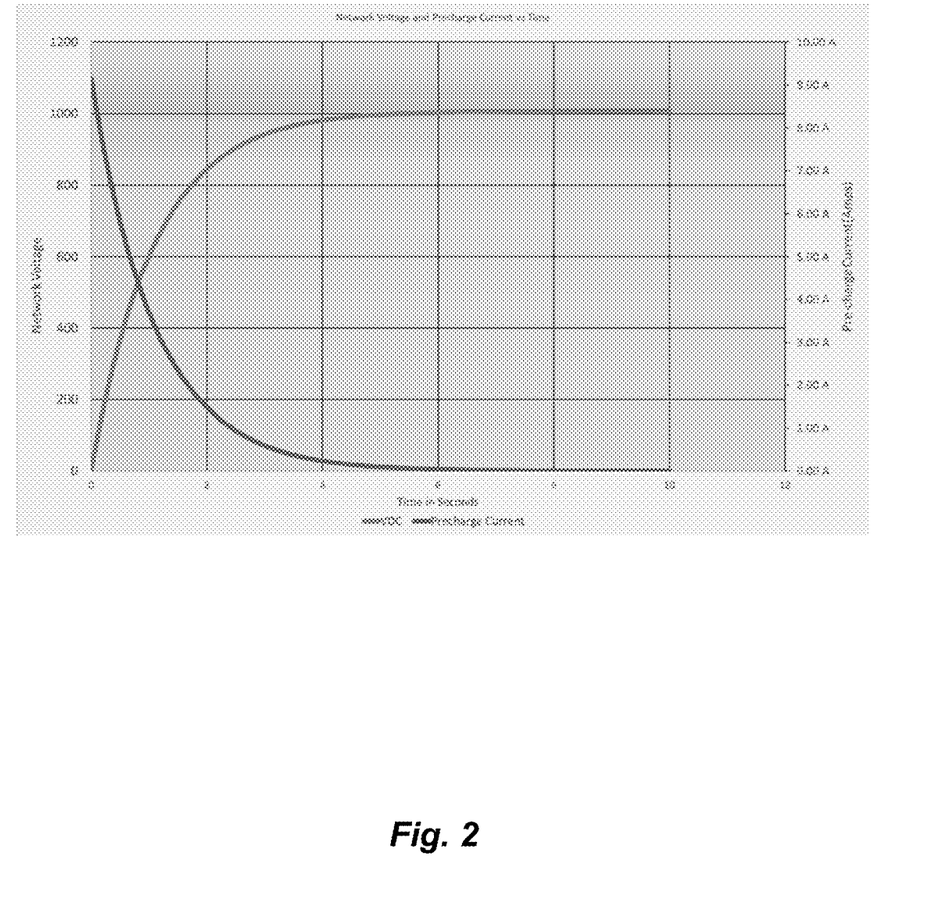
FIG. 2 shows an example of a pre-charge current and system voltage as function of time.
Figure 3:
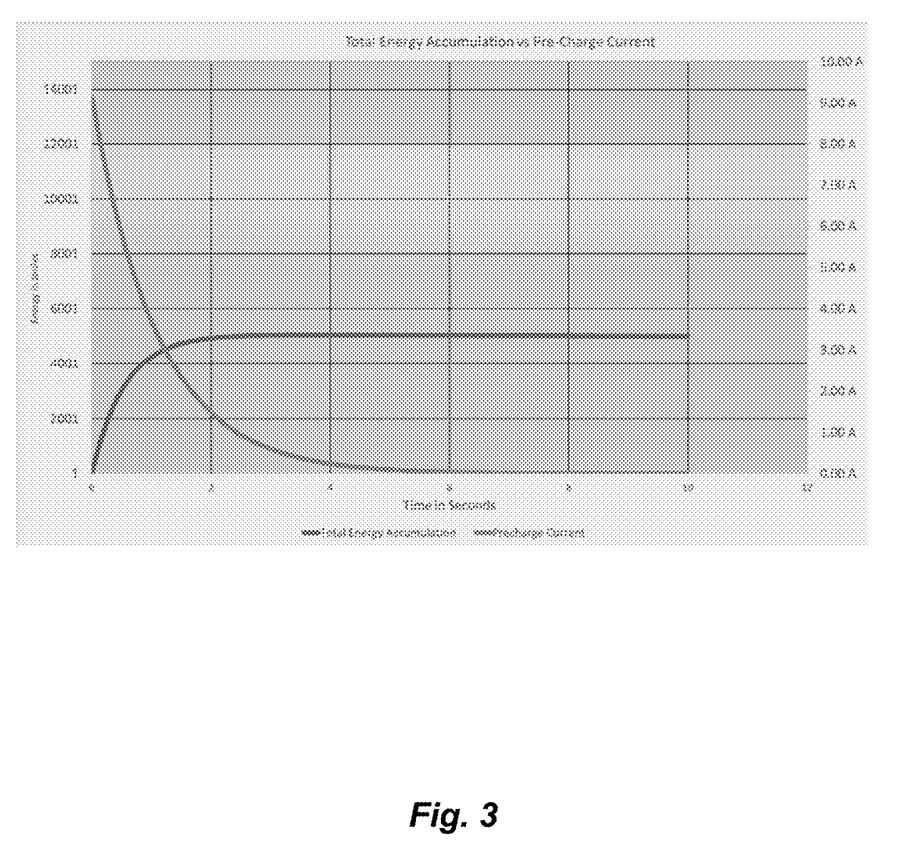
FIG. 3 shows an example of a pre-charge peak impulse energy and pre-charge current as function of time.

As present inventors have realized, the current flowing through the pre-charge resistor as a function of time can be seen to decrease exponentially while pre-charge of the application is occurring. FIG. 2 illustrates this with a curve 200 that represents the pre-charge current flowing through the pre-charge circuit and the curve 202 that represents the voltage of the Energy Storage System. The current is maximum at the start of the pre-charge process and the voltage increases at the same time the current decreases. During the pre-charge process, the pre-charge resistor will typically accumulate energy faster than it can be dissipated. This accumulated energy can be calculated as a function of time, current, and resistance. FIG. 3 illustrates the relation between the pre-charge current 300 and the accumulation of energy 302 of the resistor of the pre-charge circuit. The energy accumulated in the resistor is stable even after the exponential decay down to the steady state of the pre-charge circuit: indeed, heat dissipation of the accumulated energy is a process that is much slower than energy accumulation. The amount of energy that can be safely absorbed by the pre-charge resistor without damage or degradation of the component is defined by the material characteristics of the specific component of the resistor used. The value of the amount of energy that can be safely absorbed is specified as a maximum impulse energy, which is primarily a function of time, voltage, and resistance. This maximum impulse energy is typically given in Joules. Energy is accumulated in the pre-charge resistor in the form of heat whenever it is conducting current, this energy can be calculated as a function of current and time and is stored in the pre-charge resistor as heat. The heat dissipation of the pre-charge resistor determines how frequently it can perform a pre-charge process, as in some situations a system may perform multiple pre-charge processes that could overwhelm the energy carrying capacity of the resistor.

Building on these observations, a mechanism has been developed to track the energy accumulated by the pre-charge resistor. By using current measurements and integrating the measure with a known pre-charge-circuit configuration, the energy loading of the pre-charge resistor can be accurately determined. This value combined with a model of the energy dissipation of the pre-charge resistor can be used to create an algorithm to warn of potential damage to the pre-charge resistor due to exceeding the safe limits of operation, primarily violating the maximum impulse energy of the pre-charge resistor. Reliability and robustness of the pre-charge circuit in diverse applications is improved.

Figure 6:
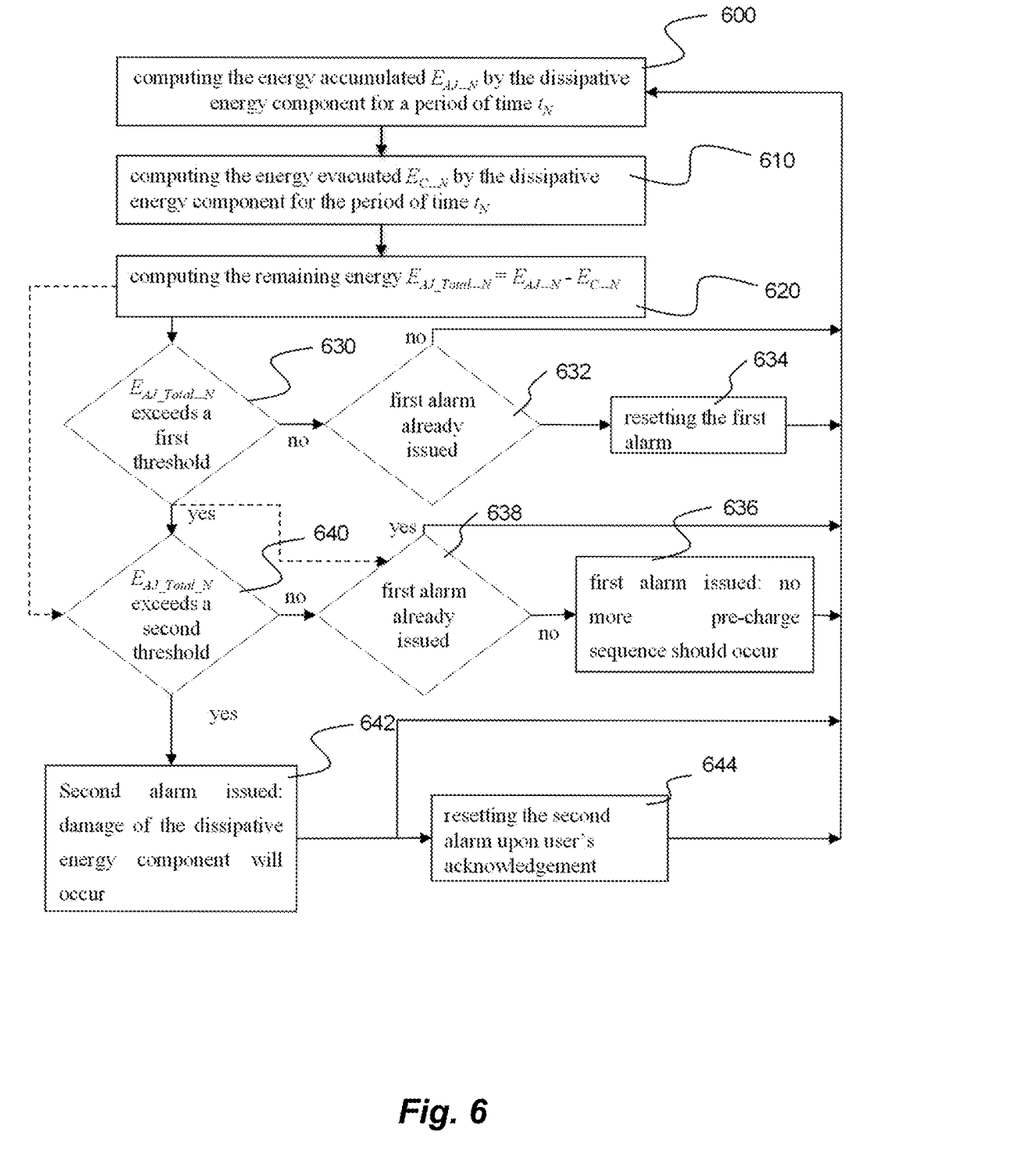
FIG. 6 is an example of a method for managing a pre-charge circuit.

An example of the method for managing a pre-charge circuit of a battery management system (BMS) is discussed, in reference to FIG. 6. The pre-charge circuit comprises at least one dissipative energy component.

For the sake of explanation only, it is reminded that BMS is Battery Management System and refers to both a design and components that comprise that design. The BMM is a Battery Management Module, which implements the components of a BMS in a specific form. For the context of this document, the terms BMM and BMS are synonymous.

Basically, the method starts with computing 600 the energy accumulated $E_{AJ\_N}$ by the dissipative energy component for a period of time $t_N$. $E_{AJ\_N}$ may be given in Joules of energy. The accumulated energy in the pre-charge resistor may depend on one or more parameters. These parameters are, but not limited to, the current flowing through the resistor, and/or the voltage across the resistor, and/or the resistance of the resistor, and/or the period of time $t_N$ the current flows through the resistor.

In examples of the method, the accumulated energy may be computed from these three above-mentioned parameters with the following equation $$E_{AJ\_N} = E_{AJ\_N-1} + I^2 r \ast t \quad \text{(eq. 1)}$$

with $E_{AJ\_N-1}$ that is a latest known value of the energy accumulated by the dissipative energy component;
$I^2$ is a square value of a current I in ampere that is measured in the resistor for the period of time $t_N$;
r is a resistance of the resistor in ohms; and
t is the time in seconds of the period of time $t_N$.

In eq. 1, the value of the resistance is known and should be the same during the execution of the method. In practice, the value of the resistance may be considered to be the same if the energy carrying capacity of the pre-charge resistor has never been overwhelmed.

The latest known value $E_{AJ\_N-1}$ of the energy accumulated by the dissipative energy component may be computed the same manner using the formula eq. 1: the computation of $E_{AJ\_N-1}$ may rely on the parameters used for computing $E_{AJ\_N}$; the parameters values are those previously measured for a period of time $t_{N-1}$. For each computation of $E_{AJ\_N}$, the result is added to a total accumulated energy variable which represents the total impulse energy absorbed by the pre-charge resistor.

In examples of the method, the latest known value $E_{AJ\_N-1}$ may equal to zero. For instance, this may be the case if a sufficiently long period of time elapsed between two inrush currents so that the dissipative energy component evacuated all the accumulated energy.

In examples of the method, at least the latest known value $E_{AJ\_N-1}$ may be stored in a memory for being used for the next computation.

In examples of the method, the latest known value $E_{AJ\_N-1}$ stored in the memory is deleted and replaced by the latest value $E_{AJ\_N}$ once computed. As a result of this operation, the value $E_{AJ\_N}$ becomes the latest known value $E_{AJ\_N-1}$. This can be noted $E_{AJ\_N-1} = E_{AJ\_N}$.

Referring back to FIG. 6, the next operation 610 comprises computing the energy evacuated $E_{C\_N}$ by the dissipative energy component for the same period of time $t_N$. The energy evacuated mainly depends on the heat dissipation of the dissipative energy component, e.g. a pre-charge resistor. The dissipative energy component may evacuate energy at the same time the dissipative energy component absorbs energy. The quantity of energy that is evacuated by the dissipative energy component may depends on one or more parameters such as, but not limited to, the temperature condition, the materials of the component. For instance, a cooling system for the dissipative energy component might be used for increasing the quantity of energy evacuated by the component.

In examples of the method, the computation 610 may be based on the data given by the manufacturer for typical energy dissipation of the dissipative energy component at ambient temperature conditions and for a given period of time. In this case, the computing may be performed by identifying a value of evacuated energy for the period of time $t_N$, e.g. a table associates a respective value of quantities of evacuated energy for different periods of time at a given temperature.

The next operation 620 comprises computing the remaining energy $E_{AJ\_Total\_N}$ stored on the dissipative energy component at the end of the period of time $t_N$. The remaining energy is the difference between the value $E_{AJ\_N}$ of the quantity of energy that has been accumulated during the period of time $t_N$ and the value $E_{C\_N}$ of the quantity of energy that has been evacuated for this same period of time $t_N$. The following equation eq. 2 can be used for the computing $E_{AJ\_Total\_N}$:

$$E_{AJ\_Total\_N} = E_{AJ\_N} - E_{C\_N} \quad \text{(eq. 2)}$$

The value $E_{AJ\_Total\_N}$ for a period of time $t_N$ may be positive or negative depending on the quantity of energy evacuated by the dissipative energy component and/or on the quantity of energy brought by the inrush current. In practice, after an inrush current, the quantity of accumulated energy $E_{AJ\_N}$ is much higher that the quantity of evacuated energy $E_{C\_N}$.

The next operation 630 comprises a comparison of the result of the computing of the operation 620 with a first known value $E_{AJ\_Total\_T1}$ of remaining energy. This first known value is predetermined and is a first threshold of remaining energy in the dissipative energy component. This comparison aims at determining whether the quantity of energy stored on the dissipative energy component exceeds or not the first threshold that represents a state of the dissipative energy component for which the dissipative energy component has exceeded a maximum of remaining energy at which a pre-charge sequence can occur. In other terms, the first threshold is chosen to be a buffer to energy accumulation associated with permanent damage of the dissipative energy component. It is to be understood that the first threshold may depend on the type dissipative energy component (e.g. the materials of the component . . . ) and on the operating conditions of the dissipative energy component (e.g. average ambient temperature . . . )

If the first threshold is not exceeded, no alarm is issued as the dissipative energy component is able to absorb the energy of a future inrush current without damages. The process can restart at 600 for a new period of time $t_{N+1}$.

Before deciding not to issue the first alarm, it may be checked (632) whether the first alarm is already issued. "Already issued" may be interpreted as meaning that the first alarm has been previously issued, for instance by performing the process of the invention for a former period of time $t_{N-1}$, $t_{N-2}$, $t_{N-M}$ and has not been reset until now; the first alarm is therefore already activated when the period of time $t_N$ is started. If the first alarm is not activated, the process can restart at 600. If on the contrary the first alarm is activated, the first alarm may be reset (634) as the dissipative energy component evacuated enough heat and is again able to safely absorb energy brought by an inrush current. The process may then be restarted (600).

If the first threshold is exceeded, then the operation 640 may performed. The operation 640 comprises a comparison of the result of the computing of the operation 620 with a second known value $E_{AJ\_Total\_T2}$ of remaining energy. This second known value is predetermined and is a second threshold. This comparison aims at determining whether the quantity of energy stored on the dissipative energy component excess or not the second threshold that represents a state of the dissipative energy component for which a permanent damage of the dissipative energy component is to be expected.

Exceeding the first threshold may be interpreted as meaning that the value of the $E_{AJ\_Total\_N}$ is greater than or equal to $E_{AJ\_Total\_T1}$ (the value of the first threshold), or is greater than $E_{AJ\_Total\_T1}$.

Exceeding the second threshold may be interpreted as meaning that the value of $E_{AJ\_Total\_N}$ is greater than or equal to $E_{AJ\_Total\_T2}$ (the value of the second threshold), or is greater than $E_{AJ\_Total\_T2}$.

If, as a result of the comparisons 640, the computed 620 remaining energy $E_{AJ\_Total\_N}$ does not exceed the second threshold, and therefore only exceeds the first threshold, then a first alarm is issued (638). The first alarm informs a user and/or a BMS and/or any system able to handle the first alarm that the dissipative energy component should not be used until the quantity of energy stored thereon has significantly decreased, or at least sufficiently decreased so that the dissipative energy component is able to absorb the energy of a future inrush current. The process may restart at 600.

Before taking the decision to issue the first alarm, a further operation 638 of checking whether the first alarm is already issued may be carried out. This allows not to issue a new first alarm while the first alarm is already activated; said otherwise, the first alarm is kept in an active state. If no first alarm is already activated, the first alarm is issued (636) and the process can then be restarted (600). If the first alarm is already activated, no further first alarm is issued, and the process can be restarted (600).

If the remaining energy $E_{AJ\_Total\_N}$ has been determined as exceeding the second threshold, then a second alarm is issued (642). The user and/or the BMS and/or any system able to handle the second alarm is(are) informed that a damage of the dissipative energy component will occur or that the dissipative energy component reached an accumulated energy limit for which damage to the pre-charge resistor is considered to have occurred. When the second alarm is issued, the BMS or the BMM or the system able to handle the second alarm may automatically decide to prevent any further pre-charge operation in order to avoid an irremediable damage of the ESS. The process may restart at 600.

The second alarm may be only reset upon user's acknowledgement for improving the safety of the ESS. The process may restart at 600, e.g. after the dissipative energy component has been replaced.

The operations 630 and 640 are successively performed in the example of FIG. 6. Alternatively, they might be performed in parallel, as depicted by the dashed arrows. In this alternative, if it is detected that the remaining energy is in excess of the second threshold, whatever is the result of the operation 630, the next step is to issue the second alarm. Still in this alternative, if it is detected that the remaining energy is exceeding the first threshold only, then the first alarm is issued. It is to be understood that the further operation 638 of checking whether the first alarm is already issued may be carried out, as already explained.

It is now discussed the period of time $t_N$ that is used for evaluating of the operations 600, 610, 620 and at least the operation 630. These operations may be evaluated for one or more periods of time $t_N$, each new evaluation being based on the current state of the system (that is, on the last evaluation). In practice, they are repeated for several consecutive periods of time $t_N$, e.g. the method is repeated while the ESS is in use—an operation of charge or discharge of the battery is performed—. Hence, and in general examples, the computations of energies 600, 610, 620 and of at least one determination 630 are iterated for P periods of time $t_{N+M}$, where M is incremented at each iteration by 1 and comprised between 1 and P. P may be selected so that the set of periods of time $t_1 \ldots t_{N+P}$ covers a use of the ESS. The consecutive periods of time may be identical, e.g. an evaluation is performed each 10 ms. The process is iterative, that is, each period of time of the succession of periods of time comprises at least the computations of the operations 600, 610, 620 based on the current state of the system. In examples, the computing 620 and the following determination(s) may be performed after the period of time $t_N$ for which the operations 600 and 610 have been carried out, typically $t_{N+1}$.

The method according to the invention permits the BMS to warn the user or the application control system to be notified if it is unsafe to attempt a further pre-charge cycle, based on configured limits (the thresholds). The method can also indicate if a damaging amount of energy has been accumulated in the pre-charge resistor and inform the application that the pre-charge resistor may be damaged and should be replaced. This is to prevent failure of the pre-charge circuit and subsequent damage to the primary current channel of the BMS, which would result in a loss of functionality and availability of the ESS.

Figure 4:
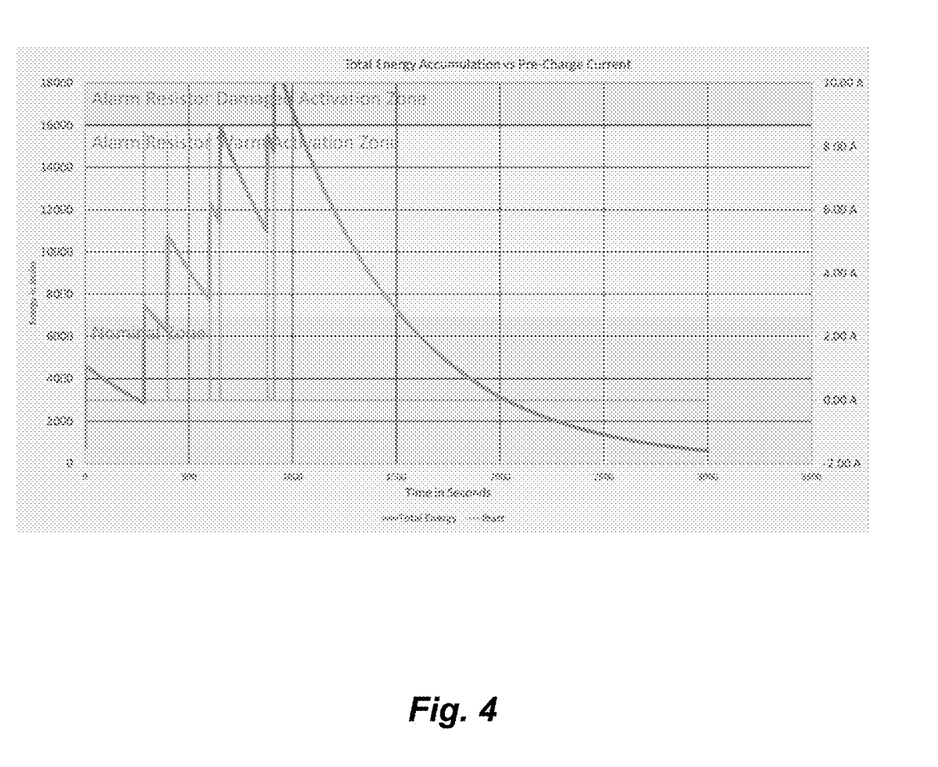
FIG. 4 shows an example of a simulation of an Energy Storage System where the BMS does not respect Alarm Resistor Warm and permit a cool down period of a pre-charge circuit.
Figure 5:
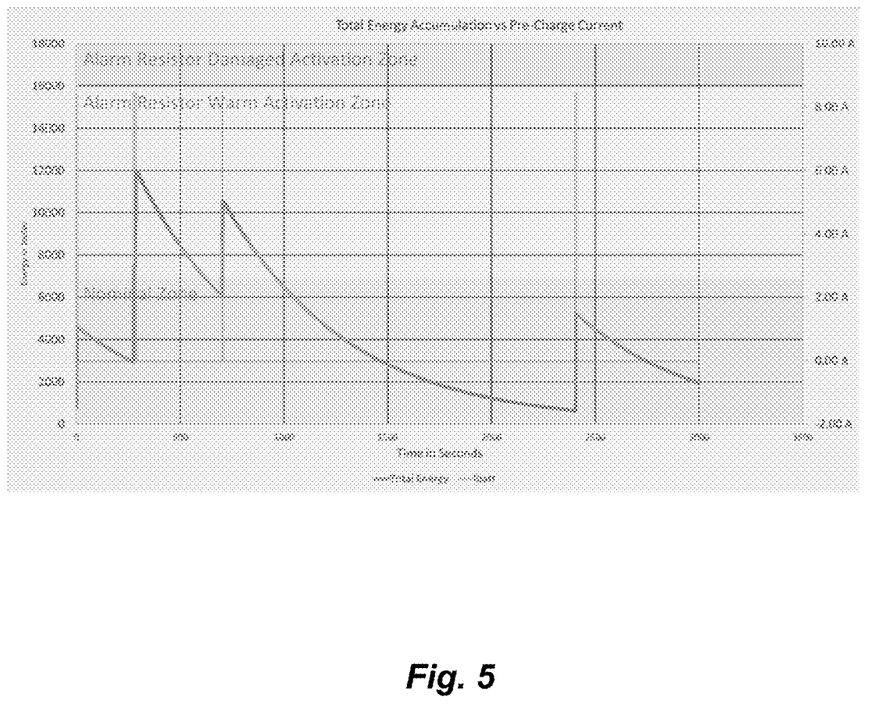
FIG. 5 shows an example of a simulation of an Energy Storage System where the BMS does respect Alarm Resistor Warm and permit a cool down period of a pre-charge circuit.

A simulated sequence of pre-charge and rest events for a hypothetical system is illustrated on FIG. 4. In this simulation, two thresholds have been defined, represented by dashed lines. Therefore, three zones of operations of the pre-charge circuit are defined. The zone 404 is referred as "nominal zone" which is a safe zone of functioning for the pre-charge circuit. The zone 406 is called "alarm resistor warm activation zone" and is comprised between the first and the second thresholds. The zone 406 corresponds to a situation it may be unsafe to perform a pre-charge sequence. The zone 408 corresponds to the second alarm that is indicating that the pre-charge resistor may be damaged due to excessive heating. Several inrush currents 400a, 400b, . . . 400f are represented on FIG. 4. For each inrush current, the remaining energy in the dissipative energy component quickly increases and then decreases until a next inrush current occurs. As the evacuation of the heat is slower than the heat increase, the first threshold is reached after few inrush currents. The inrush current 400*f* is the one that triggers the second alarm, that is, the inrush current that may have definitively damaged the dissipative energy component, e.g. the pre-charge resistor. In FIG. 4, the application is abusing the pre-charge circuit by performing many pre-charge operations without allowing sufficient time for the pre-charge circuit to dissipate the energy that is being accumulated and the energy quickly exceeds the safety limits. In FIG. 5, the BMS has more time between pre-charge sequences and does not request pre-charge to occur back to back without a cool-down period. The second alarm is thus not activated in FIG. 5.

It is now discussed an example of a BMS for performing the method. The BMS comprises at least one input connector that is connectable to an energy storage module, e.g. a battery. The BMS also comprises at least one output connector that is connectable to an application load. The application may cause an inrush current due to its capacitors and inductors. The BMS also comprises a pre-charge circuit. The pre-charge circuit may comprise a contactor and a dissipative energy component. The dissipative energy component may be a resistor, being understood that any component being able to absorb an inrush current might be used. The BMS also comprises a processing circuitry (also referred as processing unit) operatively coupled to a data storage memory. The data storage memory comprises instructions to configure the processor to perform the examples of the method discussed hereinbefore.

Figure 1:
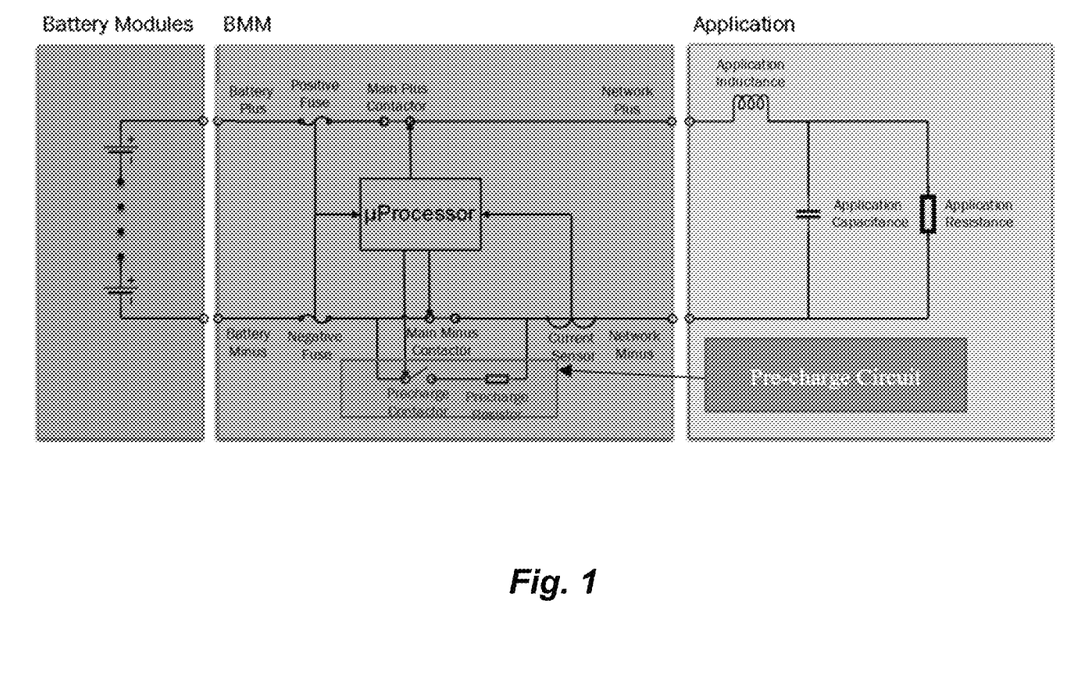
FIG. 1 illustrates an example of an Energy Storage System.

FIG. 1 is an example of an ESS that comprises a battery comprising energy storage modules, a battery management system including a BMS, and an application load. The BMS is connected to positive and negative connectors of the battery, and it comprises a pre-charge circuit with a contactor and a dissipative energy component. The BMS further comprises two outputs connectors, a positive and a negative one. An application load is connected on these two outputs connectors. The BMS may also comprises one or more fusible elements that can act to protect the system from overcurrent fault conditions. The one or more fusible elements fuses may be located on the battery positive and negative lines, thus protecting the battery and/or the application. The purpose of the positive line on the BMM is to connect the positive battery terminal to the positive terminal of the application. Similarly, the purpose of the negative line on the BMM is to connect the negative battery terminal to the negative terminal of the application. The BMS further comprises two contractors, one being on the positive line of the BMS and the other one on the negative line. The BMS also comprises a processing unit (referred as micro Processor on FIG. 1) communicatively coupled to a memory that stores instructions to perform at least one example previously discussed. In the example of FIG. 1, the BMS may be communicatively coupled with the fuses of the positive and negative lines, e.g. the processing unit may be informed of the current flowing through these lines. Still in the example of FIG. 1, the contactors on the positive and negative lines are also communicatively coupled with the processing unit that is able to open or close these positive and negative contactors; the charge process of the load by the battery can be controlled with these contactors. The BMS is also communicatively coupled with the pre-charge contactor of the pre-charge circuit, and can control the pre-charge process with this contactor. In the example of FIG. 1, the BMS also comprises a probe for measuring the current flowing though one of the lines of the BMS (here the negative line). The probe can be also referred as current sensor. During the pre-charge process, the probe thus provides the computing unit with the information relative to the quantity of current I seen in the pre-charge circuit, e.g. in the dissipative energy component of the pre-charge circuit. Thus, the instructions stored on the memory configure the processor to open and/or close the contactor on the positive and/or negative lines, and/or the pre-charge contactor. It is to be understood that the opening and closing of these contactors is performed as known in the art for performing a pre-charge or a charge operation.

The BMS is a computerized device suitably designed for implementing examples of the present invention as described herein. In that respect, it may be appreciated that the methods described herein are largely non-interactive and automated. In exemplary embodiments, the methods described herein may be implemented either in an interactive, partly-interactive or non-interactive system. The methods described herein may be implemented in software (e.g., firmware), hardware, or a combination thereof. In exemplary embodiments, the methods described herein are implemented in software, as an executable program, the latter executed by suitable digital processing devices. In further exemplary embodiments, at least one step or all steps of the methods of FIG. 1 may be implemented in software, as an executable program, the latter executed by suitable digital processing devices. More generally, embodiments of the present invention may be implemented wherein general-purpose digital computers, such as personal computers, workstations, etc., are used.

Figure 7:
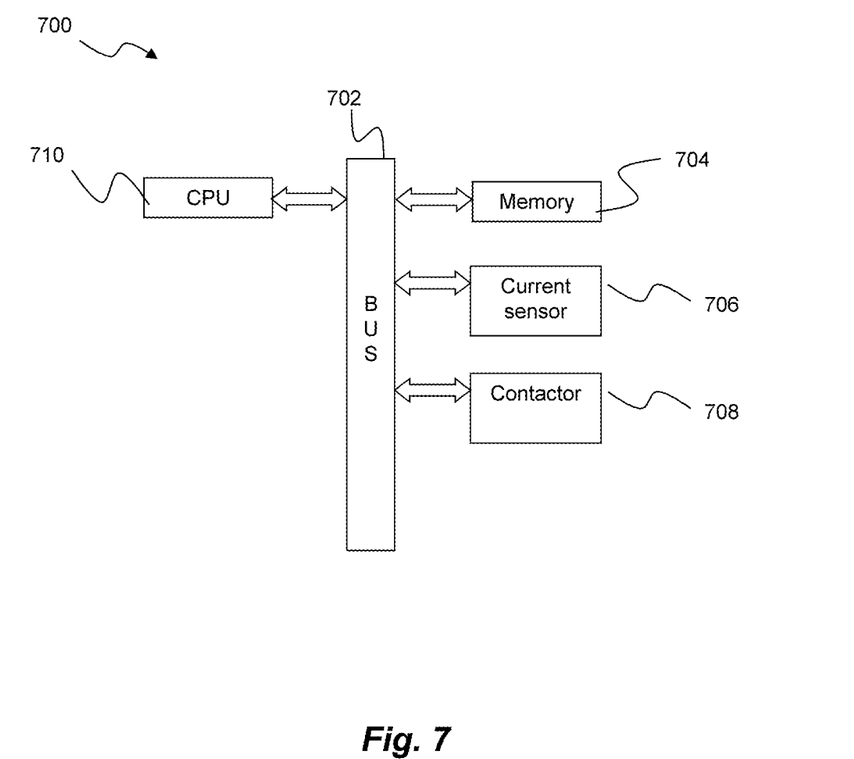
FIG. 7 is an example of a BMS.

For instance, the BMS/BMM system depicted in FIG. 1 schematically represents a computerized unit, e.g., a general-purpose computer. In exemplary embodiments, in terms of hardware architecture, as shown in FIG. 7, the unit 700 includes a processor 710, memory 704 coupled to a input/output controller 702 (referred as BUS on FIG. 7), and one or more input and/or output (I/O) devices 706, 708 (a current sensor, a contactor . . . ) that are communicatively coupled via a local input/output bus 702. Further, the input/output controller 702 may be, but is not limited to, one or more buses or other wired or wireless connections, as is known in the art. The input/output controller 702 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 710 is a hardware device for executing software, particularly that stored in memory 704. The processor 710 may be any custom made or commercially available processor, a central processing unit (CPU), an auxiliary processor among several processors associated with the system 700, a semiconductor based microprocessor (in the form of a microchip or chip set), or generally any device for executing software instructions.

The memory 704 may include any one or combination of volatile memory elements (e.g., random access memory) and nonvolatile memory elements. Moreover, the memory 704 may incorporate electronic, magnetic, optical, and/or other types of storage media. Note that the memory 704 may have a distributed architecture, where various components are situated remote from one another, but may be accessed by the processor 710.

The software in memory 704 may include one or more separate programs, each of which comprises an ordered listing of executable instructions for implementing logical functions. In the example of FIG. 7, the software in the memory 704 includes a method described herein in accordance with examples and a suitable operating system (OS). The OS essentially controls the execution of other computer programs, it being noted that methods described herein (e.g., FIG. 1) may be partly implemented as application program, and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 704, so as to operate properly in connection with the OS. Furthermore, the methods may be written as an object-oriented programming language, which has classes of data and methods, or a procedure programming language, which has routines, subroutines, and/or functions.

Possibly, a conventional keyboard and mouse may be coupled to the input/output controller. Other I/O devices may include sensors (especially in the case of network elements), i.e., hardware devices that produce a measurable response to a change in a physical condition like temperature or pressure (physical data to be monitored). Typically, the analog signal produced by the sensors is digitized by an analog-to-digital converter and sent to controllers 702 for further processing. Sensor nodes are ideally small, consume low energy, are autonomous and operate unattended.

In addition, the I/O devices may further include devices that communicate both inputs and outputs. The system 700 may further include a display controller coupled to a display. In exemplary embodiments, the system may further include a network interface or transceiver for coupling to a network.

The network transmits and receives data between the unit 700 and external systems. The network is possibly implemented in a wireless fashion, e.g., using wireless protocols and technologies, such as WiFi, WiMax, etc. The network may be a fixed wireless network, a wireless local area network (LAN), a wireless wide area network (WAN) a personal area network (PAN), a virtual private network (VPN), intranet or other suitable network system and includes equipment for receiving and transmitting signals.

The network may also be an IP-based network for communication between the unit 700 and any external server, client and the like via a broadband connection. In exemplary embodiments, network may be a managed IP network administered by a service provider. Besides, the network may be a packet-switched network such as a LAN, WAN, Internet network, etc.

When the unit 700 is in operation, the processor 710 is configured to execute software stored within the memory 704, to communicate data to and from the memory 704, and to generally control operations of the computer 700 pursuant to the software. The method described herein and the OS, in whole or in part are read by the processor 710, typically buffered within the processor 704, and then executed. When the methods described herein (e.g. with reference to FIG. 1) are implemented in software, the methods may be stored on any computer readable medium for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the unit 700, partly thereon, partly on a unit 700 and another unit 700, similar or not.

Aspects of the present invention are described above with reference to flowchart illustrations and/or block diagrams of methods, apparatus (systems) and computer program products according to embodiments of the invention. It will be understood that each block of the flowchart illustrations and/or block diagrams may be implemented by one or more computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved and algorithm optimization. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims.

What is claimed:

1. A computer-implemented method for managing a pre-charge circuit of a battery management system (BMS), the pre-charge circuit comprising a pre-charge resistor, the pre-charge resistor accumulating energy in the form of heat whenever the pre-charge resistor is conducting current, the method comprising:
computing an energy accumulated $E_{AJ\_N}$ by the pre-charge resistor for a period of time $t_N$;
computing an energy evacuated $E_{C\_N}$ by the pre-charge resistor for the period of time $t_N$;
computing a remaining energy $E_{AJ\_Total\_N}$ stored on the pre-charge resistor at the end of the period of time $t_N$ with the formula $E_{AJ\_Total\_N} = E_{AJ\_N} - E_{C\_N}$;
determining whether the computed $E_{AJ\_Total\_N}$ exceeds a first threshold representing a first known value $E_{AJ\_Total\_N\_1}$ of remaining energy;
when the remaining energy $E_{AJ\_Total\_N}$ exceeds the first threshold, issuing a first alarm informing that the pre-charge resistor has exceed a maximum of remaining energy at which a pre-charge sequence can occur; and
determining that the remaining energy $E_{AJ\_Total\_N}$ falls below the first threshold and resetting the first alarm.

2. The method of claim 1, further comprising:
determining whether the remaining energy $E_{AJ\_Total\_N}$ exceeds a second threshold representing a second value of $E_{AJ\_Total\_N}$; and
when the computed $E_{AJ\_Total\_N}$ is determined as exceeding the second threshold, issuing a second alarm informing that a damage of the pre-charge resistor will occur.

3. The method of claim 2, further comprising:
determining that the remaining energy $E_{AJ\_Total\_N}$ falls below the second threshold; and
resetting the second alarm upon user's acknowledgement.

4. The method of claim 1, wherein computing the energy accumulated $E_{AJ\_N}$ further comprises:
computing the energy accumulated $E_{AJ\_N}$ with the formula $E_{AJ\_N} = E_{AJ\_N-1} + I^2 r^* t$, where
$E_{AJ\_N-1}$ is a latest known value of the energy accumulated by the pre-charge resistor;
$I^2$ is a square value of a current I in ampere that is measured in the pre-charge resistor for the period of time $t_N$;
r is a resistance of the pre-charge resistor in ohms;
t is the time in seconds of the period of time $t_N$.

5. The method of claim 1, further comprising:
iterating the computations of energies and the determination for P further periods of time $t_{N+M}$, where M is incremented at each iteration by 1 and comprised between 1 and P.

6. A battery management system (BMS) comprising:
an input connector connectable to an energy storage module;
an output connector connectable to an application load;
pre-charge circuit comprising a pre-charge resistor;
a processing circuitry operatively coupled to a data storage memory, the data storage memory comprising instructions to configure the processing circuitry to:
compute the energy accumulated $E_{AJ\_N}$ by the pre-charge resistor for a period of time $t_N$;
compute the energy evacuated $E_{C\_N}$ by the pre-charge resistor for the period of time $t_N$;
compute the remaining energy $E_{AJ\_Total\_N}$ stored on the pre-charge resistor at the end of the period of time $t_N$ with the formula $E_{AJ\_Total\_N} = E_{AJ\_N} - E_{C\_N}$;
determine whether the computed $E_{AJ\_Total\_N}$ exceeds a first threshold representing a first value of $E_{AJ\_Total\_N}$;
issue, when the remaining energy $E_{AJ\_Total\_N}$ is determined as exceeding the first threshold, a first alarm informing that the pre-charge resistor has exceed a maximum of remaining energy at which a pre-charge sequence can occur; and
determine that the remaining energy $E_{AJ\_Total\_N}$ falls below the first threshold and resetting the first alarm.

7. The battery management system (BMS) of claim 6, further comprising instructions to configure the processor to determine whether the remaining energy $E_{AJ\_Total\_N}$ exceeds a second threshold larger than the first threshold, the second threshold representing a second value of $E_{AJ\_Total\_N}$; and when the computed $E_{AJ\_Total\_N}$ is determined as exceeding the second threshold, to issue a second alarm informing that a damage of the pre-charge resistor will occur.

8. The battery management system (BMS) of claim 7, further comprising instructions to configure the processor to determine that the remaining energy $E_{AJ\_Total\_N}$ falls below the second threshold, and to reset the second alarm upon user's acknowledgement.

9. The battery management system (BMS) of claim 6, wherein:
the instructions to configure the processor to compute the energy accumulated $E_{AJ\_N}$ further comprises instructions to configure the processor to compute the energy accumulated $E_{AJ\_N}$ with the formula $E_{AJ\_N}=E_{AJ\_N-1}+I^2r*t$, where
$E_{AJ\_N-1}$ is a latest known value of the energy accumulated by the pre-charge resistor;
$I^2$ is a square value of a current I in ampere that is measured in the pre-charge resistor for the period of time $t_N$;
r is a resistance of the pre-charge resistor in ohms;
t is the time in seconds of the period of time $t_N$.

10. The battery management system (BMS) of claim 9, further comprising:
a current sensor for measuring the current I in the pre-charge resistor, the current sensor being communicatively coupled to the processing circuitry.

11. The battery management system (BMS) of claim 6, wherein the pre-charge circuit is connected in parallel to main power contactor on a line connecting an input connector with an output connector, and wherein the pre-charge circuit further comprises a pre-charge contactor and a pre-charge resistor, and further comprising instructions to configure the processor to open and/or close the contactor on the line and/or the pre-charge contactor.

12. The battery management system (BMS) of claim 6, further comprising instructions to configure the processor to iterate the computations of energies and the determination for P further periods of time $t_{N+M}$, where M is incremented at each iteration by 1 and comprised between 1 and P.

13. A non-transitory computer-readable data storage medium comprising instructions causing a computer to:
compute the energy accumulated $E_{AJ\_N}$ by the pre-charge resistor component for a period of time $t_N$;
compute the energy evacuated $E_{C\_N}$ by the pre-charge resistor for the period of time $t_N$;
compute the remaining energy $E_{AJ\_Total\_N}$ stored on the pre-charge resistor at the end of the period of time $t_N$ with the formula $E_{AJ\_Total\_N}=E_{AJ\_N}-E_{C\_N}$;
determine whether the computed $E_{AJ\_Total\_N}$ exceeds a first threshold representing a first value of $E_{AJ\_Total\_N}$;
issue, when the computed $E_{AJ\_Total\_N}$ is determined as exceeding the first threshold, a first alarm informing that the pre-charge resistor has exceed a maximum of remaining energy at which a pre-charge sequence can occur; and
determine that the computed $E_{AJ\_Total\_N}$ falls below the first threshold and resetting the first alarm.

14. The computer-readable data storage medium of claim 13, further comprising instructions causing a computer to
determine whether the computed $E_{AJ\_Total\_N}$ exceeds a second threshold larger than the first threshold, the second threshold representing a second value of $E_{AJ\_Total\_N}$, and when the computed $E_{AJ\_Total\_N}$ is determined as exceeding the second threshold, to issue a second alarm informing that a damage of the pre-charge resistor will occur; and
determine that the computed $E_{AJ\_Total}$ falls below the second threshold, and to reset the second alarm upon user's acknowledgement.

15. The computer-readable data storage medium of claim 13, wherein:
the instructions to configure the processor to compute the energy accumulated $E_{AJ\_N}$ further comprises instructions to configure the processor to compute the energy accumulated $E_{AJ\_N}$ with the formula $E_{AJ\_N}=E_{AJ\_N-1}+I^2r*t$, where
$E_{AJ\_N-1}$ is a latest known value of the energy accumulated by the pre-charge resistor;
$I^2$ is a square value of a current I in ampere that is measured in the pre-charge resistor for the period of time $t_N$;
r is a resistance of the pre-charge resistor in ohms;
t is the time in seconds of the period of time $t_N$.

16. The computer-readable data storage medium of claim 13, wherein the instructions further comprise instructions to configure the processor to iterate the computations of energies and the determination for P further periods of time $t_{N+M}$, where M is incremented at each iteration by 1 and comprised between 1 and P.

* * * * *